(12) United States Patent
Kamity et al.

(10) Patent No.: US 8,554,748 B1
(45) Date of Patent: Oct. 8, 2013

(54) METHOD AND APPARATUS FOR DIFFERENTIAL FILE BASED UPDATE FOR EMBEDDED SYSTEMS

(75) Inventors: Kiran Kamity, Sunnyvale, CA (US); Mitalee Gujar, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 1603 days.

(21) Appl. No.: 11/292,396

(22) Filed: Nov. 30, 2005

(51) Int. Cl.
*G06F 7/00* (2006.01)
*G06F 17/00* (2006.01)

(52) U.S. Cl.
USPC ............ 707/694; 707/634; 707/697; 717/168

(58) Field of Classification Search
USPC .......................... 707/634, 694, 697; 717/168
See application file for complete search history.

(56) References Cited

U.S. PATENT DOCUMENTS

| | | | | |
|---|---|---|---|---|
| 5,778,389 | A * | 7/1998 | Pruett et al. ................... | 707/204 |
| 6,006,034 | A * | 12/1999 | Heath et al. ................... | 717/170 |
| 6,493,871 | B1 * | 12/2002 | McGuire et al. .............. | 717/173 |
| 6,832,373 | B2 * | 12/2004 | O'Neill ......................... | 717/171 |
| 6,880,086 | B2 * | 4/2005 | Kidder et al. ................. | 713/191 |
| 7,003,563 | B2 * | 2/2006 | Leigh et al. ................... | 709/223 |
| 7,039,918 | B2 * | 5/2006 | Jones et al. ................... | 719/310 |
| 7,086,049 | B2 * | 8/2006 | Goodman ...................... | 717/168 |
| 7,096,311 | B2 * | 8/2006 | Chiang .......................... | 711/100 |
| 7,313,577 | B2 * | 12/2007 | Peng ............................. | 707/203 |
| 7,313,792 | B2 * | 12/2007 | Buban et al. .................. | 717/170 |
| 7,350,205 | B2 * | 3/2008 | Ji .................................. | 717/172 |
| 7,373,498 | B2 * | 5/2008 | Bolay et al. ................... | 713/100 |
| 7,392,324 | B2 * | 6/2008 | Cardone et al. ............... | 709/238 |
| 7,549,042 | B2 * | 6/2009 | Glaum et al. ................. | 713/100 |
| 7,595,902 | B2 * | 9/2009 | Yamaguchi et al. .......... | 358/1.15 |
| 7,680,932 | B2 * | 3/2010 | Defaix et al. ................. | 709/225 |
| 2004/0098420 | A1 * | 5/2004 | Peng ............................. | 707/203 |
| 2004/0098427 | A1 * | 5/2004 | Peng ............................. | 707/205 |
| 2004/0162893 | A1 * | 8/2004 | Brown et al. ................. | 709/222 |
| 2005/0027758 | A1 * | 2/2005 | Meller et al. ................. | 707/204 |
| 2005/0144141 | A1 * | 6/2005 | Nagao ........................... | 705/59 |
| 2005/0210459 | A1 * | 9/2005 | Henderson et al. ........... | 717/168 |
| 2006/0101092 | A1 * | 5/2006 | Ishida et al. .................. | 707/203 |
| 2006/0206536 | A1 * | 9/2006 | Sawdon et al. ............... | 707/200 |

OTHER PUBLICATIONS

Altuscn, "pcIPcard IP9001 User Manual", Jun. 9, 2005.*

* cited by examiner

*Primary Examiner* — Shew-Fen Lin
(74) *Attorney, Agent, or Firm* — Perkins Coie LLP

(57) ABSTRACT

A system is provided including a host processing system and a remote management module coupled to it. The host processing system is configured to receive an update package. The remote management module is configured to determine one or more modified files from the update package and update its current embedded system by replacing, with the one or more modified files, only those files associated with the current embedded system that correspond to the one or more modified files.

27 Claims, 6 Drawing Sheets

METHOD AND APPARATUS FOR DIFFERENTIAL FILE BASED UPDATE FOR EMBEDDED SYSTEMS

FIELD OF THE INVENTION

At least one embodiment of the present invention pertains to remote management of a processing system and more particularly, to a method and apparatus for differential file based update for embedded systems.

BACKGROUND

In many types of computer networks, it is desirable to be able to perform certain management related functions on a processing system from a remote location. For example, a business enterprise may operate a large computer network that includes numerous client and server processing systems (hereinafter "clients" and "servers", respectively). With such a network, it may be desirable to allow a network administrator to perform or control various functions on the clients and/or servers from a remote console via the network.

Some existing computer systems allow management related functions to be performed remotely via a network. In one approach, a device known as a service processor is incorporated into a processing system to enable remote management of the processing system (referred to as the "host" processing system) via a network. The service processor is often in the form of a dedicated circuit card separate from the other elements of the host processing system. The service processor normally has a network interface that connects to the network and a separate internal interface that connects to one or more components of the processing system. The service processor typically includes control circuitry (e.g., a microprocessor or microcontroller), which is programmed or otherwise configured to respond to commands received from a remote administrative console via the network, and to perform at least some of the management functions mentioned above.

A service processor that is capable of controlling its host processing system remotely may be referred to as a remote management module (RMM). An RMM may be implemented as an add-in card and may provide console port capabilities over a local area network (LAN) or wide area network (WAN) connection and CLI functions to allow remote management of the host processing system.

An RMM may run an embedded operating system, such as Linux, inside a microprocessor. An embedded system is a special-purpose computer system, which is completely encapsulated by the device it controls. An embedded operating system is an operating system for embedded systems. An RMM may store the RMM software in its non-volatile memory, e.g., a FLASH chip. Software that has been stored onto non-volatile memory may be referred to as firmware. When a new version of the RMM software becomes available, the current RMM software may be updated with the new version.

In some existing systems, the firmware of the RMM is updated through a serial link between the host and the RMM. Once the update firmware reaches the RMM, it is burnt onto the RMM's FLASH chip. The methods currently used for file transfer over a serial link and for burning software onto a FLASH chip may result in unacceptably slow updates, because the serial interface is slow and a FLASH chip is slow electronically.

Two bottlenecks in the RMM update process are, therefore, the slow serial interface between the host and RMM and the FLASH chip being slow electronically.

SUMMARY

A system and method are provided for differential file based update for embedded systems. The system includes a host processing system and a remote management module coupled to it. The host processing system is configured to receive an update package. The remote management module is configured to determine one or more modified files from the update package and update its current embedded system by replacing, with the one or more modified files, only those files associated with the current embedded system that correspond to the one or more modified files.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

As described in detail below, the technique introduced herein addresses problems associated with transferring RMM software updates via a communications link and storing the updated software onto electronically slow non-volatile memory. The communications link may be, for example, a serial link or an Ethernet or wireless network link. In one embodiment of the present invention, a layer of granularity is added by using a differential file based approach, where only the files that have changed between versions are being updated.

In one embodiment of the present invention, when an update package for an RMM for a storage system becomes available, an administrator of the storage system may issue a command to the storage system to retrieve the update package and to replace the current RMM software with the updated software. In one embodiment of the invention, the storage OS in the storage system may obtain the update package from, for example, an update web site configured to provide update packages. An update package may comprise a boot loader, a kernel, and a file system. Next, the storage OS, rather than sending the whole update package to the RMM over the serial link, sends to the RMM metadata associated with the update package. In one embodiment, metadata comprises checksums for the files in the update package. The metadata allows the RMM to determine which files from the update package have been changed, added or deleted, as compared to the software currently running on the RMM. The RMM then receives from the storage OS only those files that have been changed or added, and updates the software stored in RMM's non-volatile memory (e.g., FLASH memory) with the received files, as described in further detail below. Thus, only the new and updated files are being transmitted over the serial link between the storage software and the RMM. Also, only the files corresponding to the changed files and any new files are being burned onto the FLASH memory. This approach may result in increased update speed and faster flash updates.

It will be noted, that a differential file based approach may be used for upgrading the RMM software, downgrading the RMM software, or otherwise updating the RMM software.

In one embodiment, the present invention may be implemented in the context of a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1.

Figure 1:
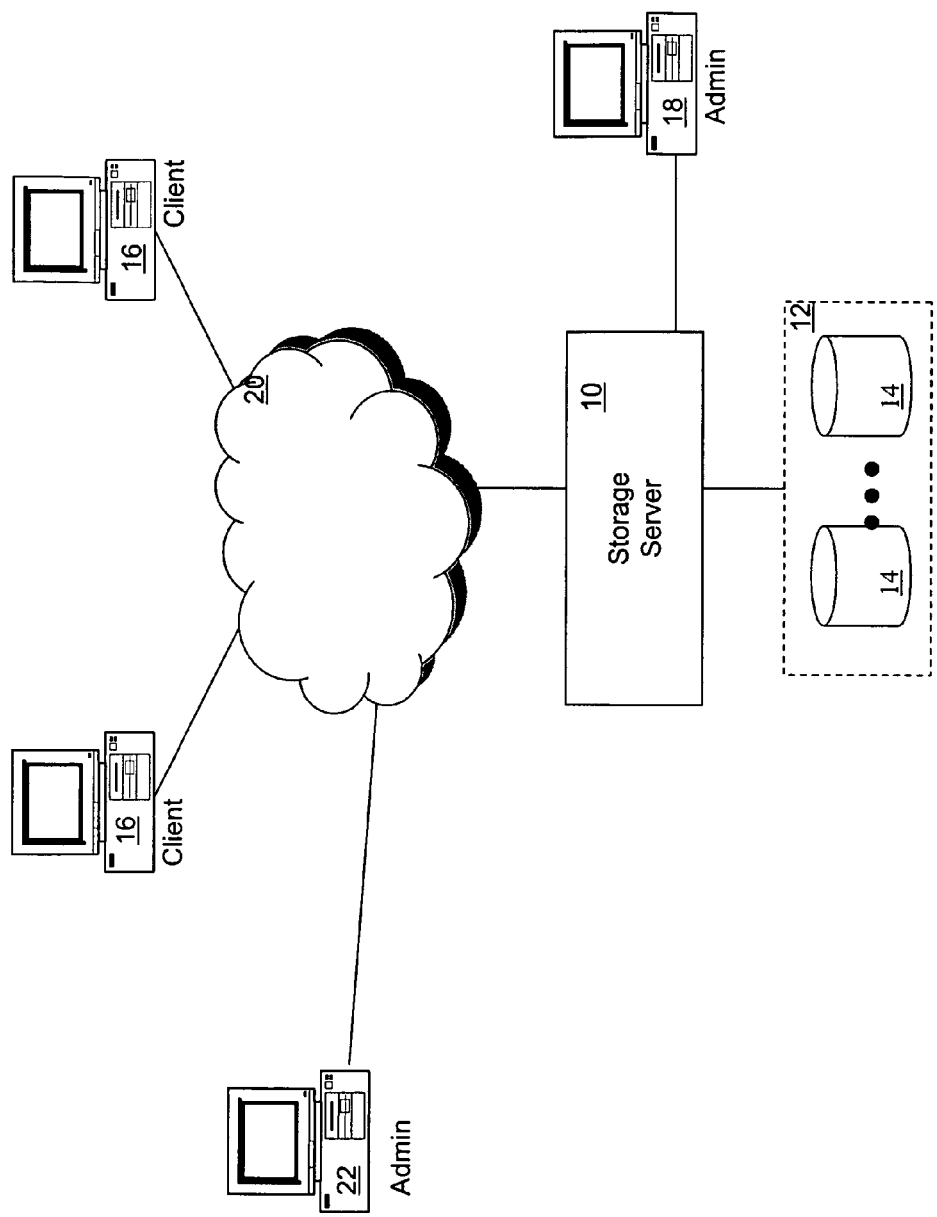
FIG. 1 illustrates a network environment which includes a storage server that can be managed remotely from an administrative console, according to embodiments of the present invention.

In FIG. 1, a storage server 10 is coupled locally to a storage subsystem 12, which includes a set of mass storage devices 16, and to one or more clients 16 through a network 20, such as a LAN or WAN. The storage server 10 operates on behalf of the clients 16 to store and manage shared files or other units of data (e.g., blocks) in the set of mass storage devices. Each of the clients 16 may be, for example, a conventional personal computer (PC), workstation, or the like. The storage subsystem 12 is managed by the storage server 10. The storage server 10 receives and responds to various read and write requests from the clients 16, directed to data stored in, or to be stored in, the storage subsystem 12. The mass storage devices in the storage subsystem 12 may be, for example, conventional magnetic disks, optical disks such as CD-ROM or DVD based storage, magneto-optical (MO) storage, or any other type of non-volatile storage devices suitable for storing large quantities of data. The mass storage devices may be organized into one or more volumes of Redundant Array of Inexpensive Disks (RAID).

Also shown in FIG. 1 is an administrative console 18 coupled to the storage server 10. The storage server 10 in this configuration includes a serial port and appropriate software to allow direct communication between the storage server 10 and the administrative console 18 through a transmission line. This configuration enables a network administrator to perform at least some of the types of management functions mentioned above on the storage server 10.

A storage server 10 can have a service processor coupled to it, which enables remote management of the processing system via a network 20. (Alternatively a service processor may be an internal component of the storage server.) The storage server 10 can be managed through a network 20 from a remote administrative console 18, in addition to being capable of being managed through the direct serial interface. It will be noted, that although the processing system to be remotely managed illustrated in FIG. 1 is a storage server 10, the technique introduced herein can also be applied to essentially any other type of network-connected processing system, such as standard personal computers (PCs), workstations, servers other than storage servers, etc. The storage server 10 may be, for example, a file server, and more particularly, may be a network attached storage (NAS) appliance. Alternatively, the storage server 10 may be a server that provides clients 16 with access to individual data blocks, as may be the case in a storage area network (SAN). Alternatively, the storage server 10 may be a device that provides clients 16 with access to data at both the file level and the block level.

Figure 2:
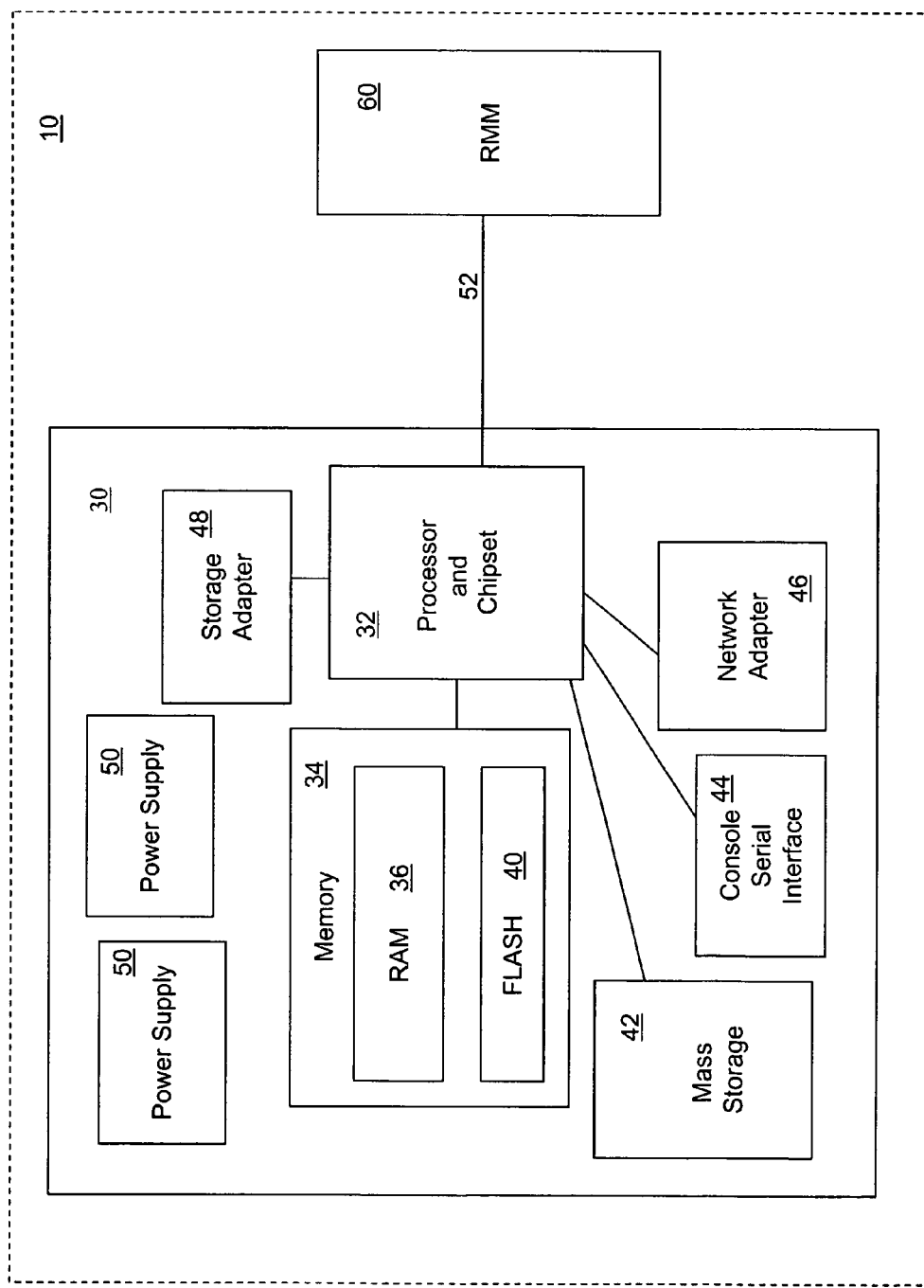
FIG. 2 is a block diagram of the storage server with a remote management module (RMM), according to embodiments of the invention.

FIG. 2 is a high-level block diagram of the storage server 10, according to at least one embodiment of the invention. In FIG. 2, the storage server 10 is represented as comprising a host processing system 30 and an RMM 60. The RMM 60 may be configured to enable remote management of the storage server 10 from the administrative console 18 via the network 20. In one embodiment, the RMM 60 is an add-in circuit card separate from the components of the storage server 10.

The storage server 10 includes one or more processors 32 and memory 34, which may be coupled to each other through a chipset. A chipset may include, for example, a conventional Northbridge/Southbridge combination. The processor 32 represents the central processing unit (CPU) of the storage server 10 and may be, for example, one or more programmable general-purpose or special-purpose microprocessors or digital signal processors (DSPs), microcontrollers, application specific integrated circuits (ASICs), programmable logic devices (PLDs), or a combination of such devices. The memory 34 includes a system memory 36, such as random access memory (RAM), to store processor data and instructions and an embedded system storage device 40. The embedded system storage device 40 is preferably a non-volatile memory device suitable for storing code required to transition the storage server 10 from a standby or off state to an operational state in which application or operating system programs can run. The embedded system storage device 40 includes a set of instructions that are executed immediately after the system is booted, as well as the kernel, the file system, system logs, and environmental variables.

The storage server 10 may also include one or more internal mass storage devices 42, a console serial interface 44, a network adapter 46 and a storage adapter 48, which are coupled to the processor 32. The storage server 10 may further include redundant power supplies 50. The internal mass storage devices 42 may include any conventional medium for storing large volumes of data in a non-volatile manner, such as one or more magnetic or optical based disks. The serial interface 44 allows a direct serial connection with a local administrative console, such as console 18 in FIG. 1, and may be, for example, an RS-232 port. The storage adapter 48 allows the storage server 10 to access the storage subsystem 12 and may be, for example, a Fibre Channel adapter or a SCSI adapter. The network adapter 46 provides the storage server 10 with the ability to communicate with remote devices, such as the clients 16, over network 16, and may be, for example, an Ethernet adapter.

In FIG. 2, the RMM 60 is coupled to the host processing system 30 via a dedicated hardware link 52. The hardware link 52 may be, for example, a serial port connection, a parallel port connection, or an inter-IC (IIC or I²C) bus.

Figure 3:
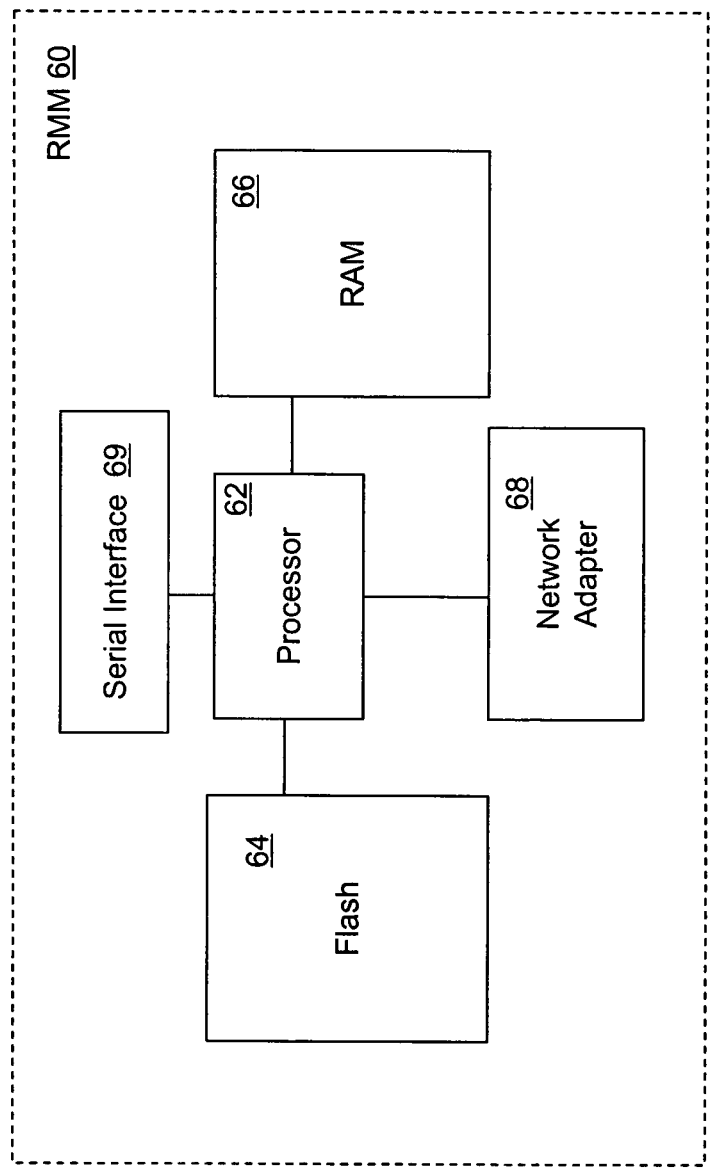
FIG. 3 is a block diagram showing components of the RMM, according to embodiments of the invention.

FIG. 3 is a high-level block diagram showing the relevant components of the RMM 60, according to certain embodiments of the invention. The various components of the RMM 60 may be implemented on a dedicated circuit card installed within the storage server. The RMM 60 includes control circuitry, such as one or more processors 62, as well as various forms of memory coupled to the processor, such as FLASH memory 64 and RAM 66. The RMM 60 further includes a network adapter 68 to connect the RMM 60 to the network. The network adapter 68 may include, for example, an Ethernet adapter. The RMM 60 further includes a serial interface 69 to allow direct communication between the RMM 60 and an administrative console through a transmission line. Although not illustrated as such, the RMM 60 may include a chipset or other form of controller/bus structure, connecting some or all of its various components.

The processor 62 is the CPU of the RMM 60 and may be, for example, one or more programmable general-purpose or special-purpose microprocessors, DSPs, microcontrollers, ASICs, PLDs, or a combination of such devices. The processor 62 inputs and outputs various control signals and data to and from the host processing system 30. In at least one embodiment, the processor 62 is a conventional programmable, general-purpose microprocessor, which runs software from local memory on the RMM 60 (e.g., FLASH 62 and/or RAM 66).

Updates to the RMM software may be delivered directly to the RMM 60 via the network adapter 68. Alternatively, the update package may first be delivered to the RMM's host and then the necessary files may be transmitted to the RMM 60 via the serial interface 69. The necessary files may then be stored onto the FLASH 64.

At a high level, the software of the RMM 60 has two layers, namely, an operating system kernel (the kernel) and an application layer that runs on top of the kernel. The root file system constitutes application binaries, daemon processes, and configuration information. In certain embodiments, the kernel is a Linux based kernel. The kernel, in one embodiment, may include a network interface to control network communications with a remote processing system and a storage server interface to control communications with the other components of the storage server 10. The network interface may include a protocol stack. The protocol stack, in turn, may include a sockets layer, a Secure Shell (SSH) layer, an IP/TCP/UDP layer, a secure sockets layer (SSL), and an Ethernet driver layer. The storage server interface may include a serial driver, through which the RMM 60 can communicate with the operating system of the storage server 10, and an IIC control module, through which the RMM 60 can communicate with other components of the storage server 10 over an IIC bus.

The RMM application layer, in one embodiment, includes a packet layer that cooperates with the associated serial driver. The application layer (root FS) may also include a command line interface (CLI) to allow an authorized user to control functions of the RMM 60, an application programming interface (API) to allow an authorized remote application to make calls to the RMM software, an event monitoring module to request event data from the host 30, and an event management module to receive event information from the event monitoring module.

Figure 4:
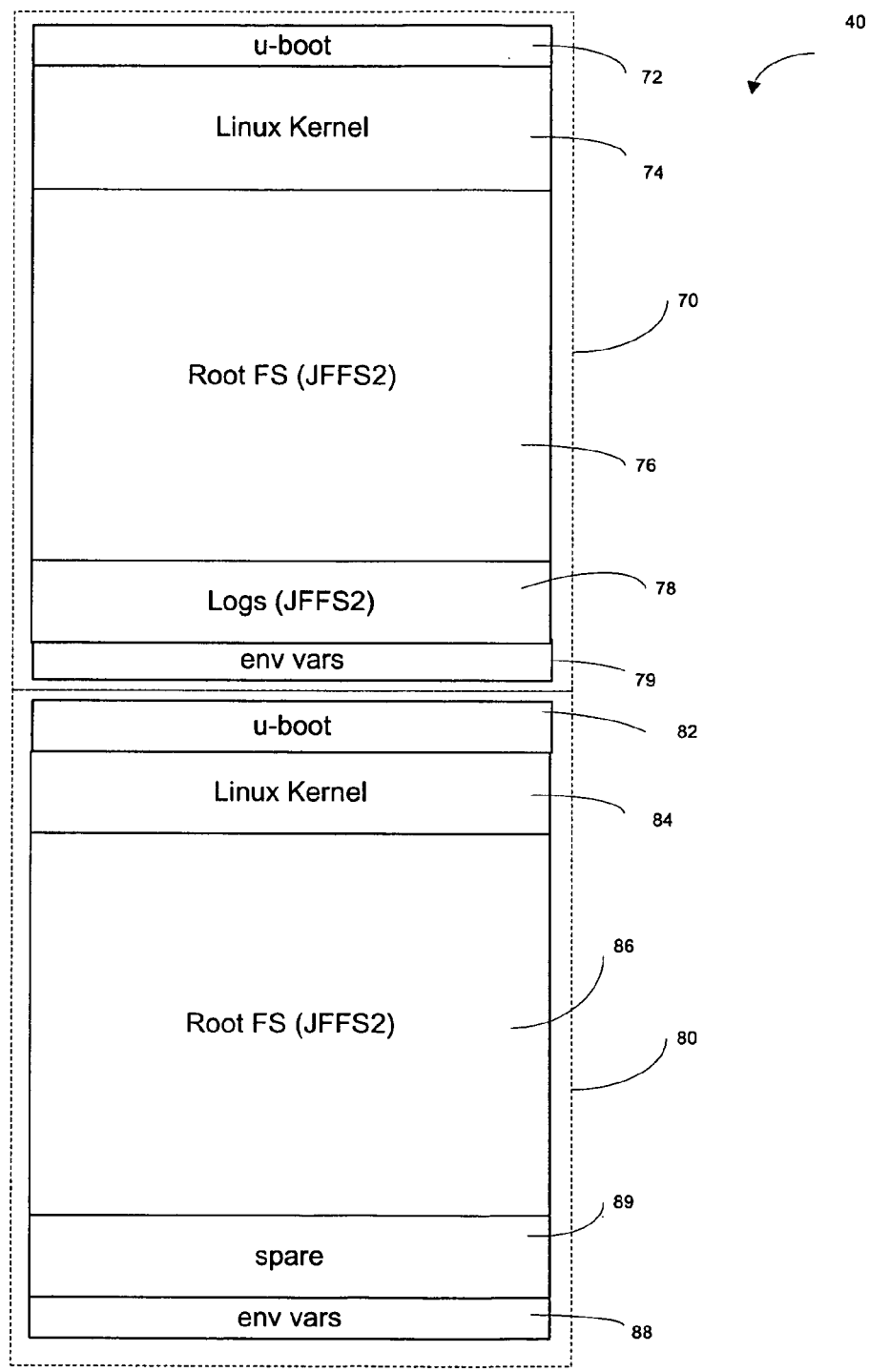
FIG. 4 illustrates a partitioning scheme for the non-volatile memory of the RMM, according to embodiments of the invention.

FIG. 4 illustrates a partitioning scheme for the non-volatile memory of the RMM, (e.g., FLASH 64), according to embodiments of the invention. The non-volatile memory of the RMM, in one embodiment, comprises a primary partition 70 to store the current version of the RMM software, and a backup partition 80 to store a previous version of the RMM software.

The primary partition 70 comprises a boot loader 72 to load the operating system, an operating system kernel 74 (e.g., a Linux based kernel), a root FS 76 and its logs 78, and environmental variables 79. The root FS, in one embodiment, is the Journaling FLASH File System, version 2 (JFFS2). JFFS2 is a log-structured file system for use in FLASH memory devices.

The backup partition 80 also comprises a boot loader 82, an operating system kernel 84, a root file system (root FS) 86, and environmental variables 88. In one embodiment, the backup partition 80 may allow a certain amount of spare storage space 89.

The boot loader 72 and the kernel 74, in one embodiment, each comprise a single file. The root FS 76, on the other hand, may comprise a plurality of files. Some of the files associated with the updated version of the RMM software may comprise files that are the same as the corresponding files in the current RMM software, while other files associated with the updated version of the RMM software may comprise an updated version of the corresponding files in the current RMM software.

Figure 5:
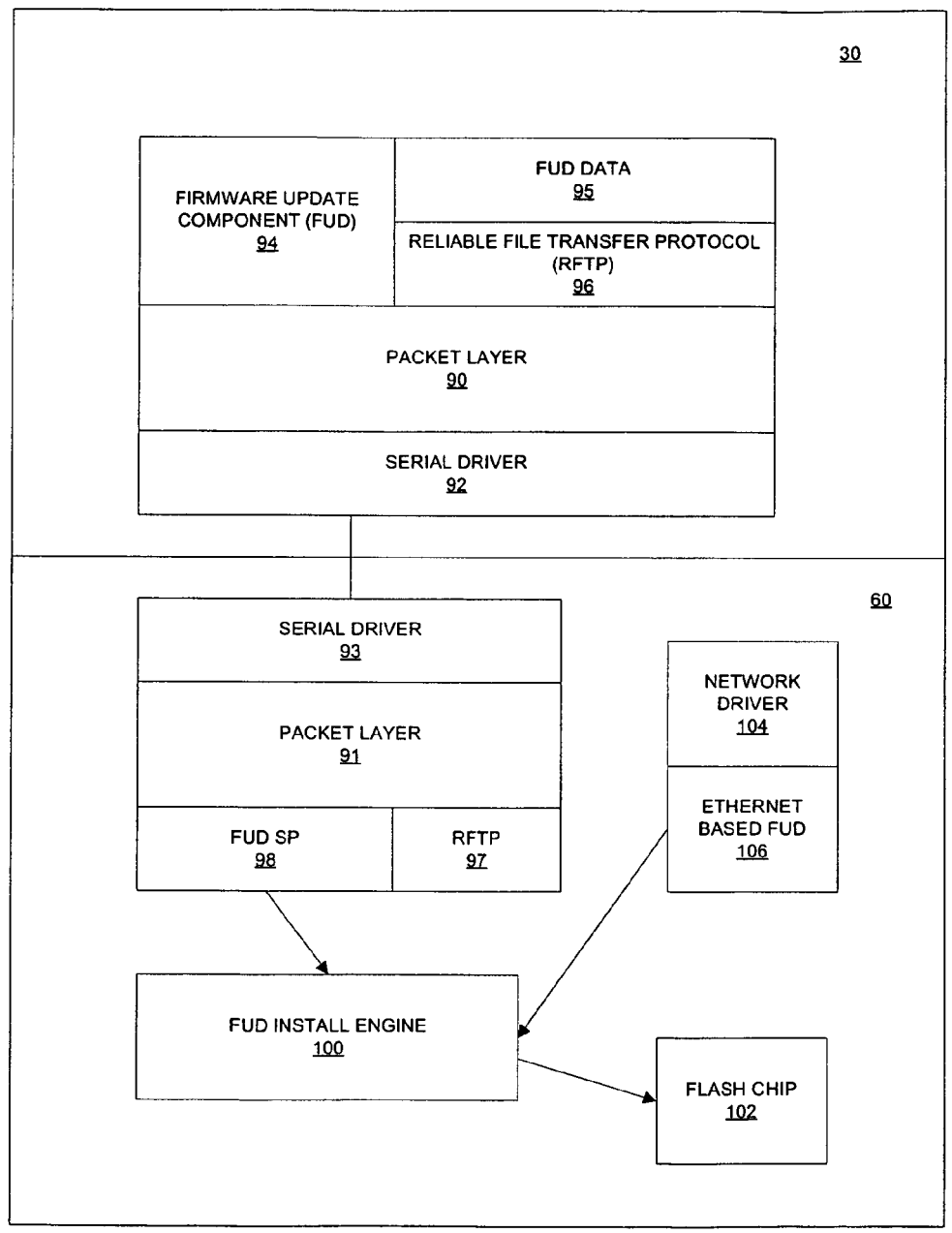
FIG. 5 is a block diagram of the storage server including firmware update components of the host processing system and the RMM, according to embodiments of the invention.

FIG. 5 illustrates relevant aspects of the update components of the storage system 10, in conjunction with the RMM 60, according to certain embodiments of the invention. As illustrated in FIG. 5, a host may exchange data with an RMM via a serial interface, such as RS232. RS232 stands for recommended standard-232, a standard interface approved by the Electronic Industries Alliance (EIA) for connecting serial devices.

The host 30 and the RMM 60 each include a packet layer (reference numerals 90 and 91 respectively) that cooperates with an associated serial driver (reference numerals 92 and 93 respectively). In order to facilitate updates of the RMM software, the host 30 may implement a firmware update (FUD) control component 94 and an associated FUD data component 95.

As described above, the host 30 may obtain an update package from an update website and store it in its memory until a firmware update component of the RMM 60 determines which files from the update package are different from the files comprising the current RMM software. The data associated with the RMM updates is communicated to the RMM utilizing a reliable file transfer protocol (RFTP). RFTP, (reference numerals 96 and 97 on the host side and on the RMM side respectively) may be designed to address issues associated with transferring large files.

On the RMM side, components that are utilized to update the RMM software, in addition to the packet layer 91, the serial driver 93, and the RFTP 97, comprise a firmware update component for handling updates received via a serial port (FUD SP) 98. When update-related data, such as metadata or modified files from the update package are transmitted to the RMM 60 via the serial link, the data is communicated via the packet layer 91, utilizing the FUD SP 98 and the RFTP 97. Once the files that were determined by the FUD SP 98 to be different from the current RMM software are received by the RMM 60 from the host 30, these files are stored by a FUD install engine 100 onto a FLASH chip 102, in order to update the current RMM software.

In one illustrative embodiment, an update package may be obtained by the RMM 60 directly, without the use of the host 30, via a network driver 104. When the RMM 60 receives the update package, it stores the package in memory and then processes update-related data to determine what files have changed in the update package as compared to the current RMM software. This processing may be performed by a network-based FUD component 106. Once the network-based FUD 106 determines the files that have been changed, added, or deleted, as compared to the current RMM software, the changed and newly added files are accessed by the FUD install engine 100 and stored onto a FLASH chip 102, in order to replace the corresponding files of the current RMM software.

As mentioned above, reliable transfer of files associated with RMM update software may be accomplished by utilizing a reliable ftp (RFTP). The overall design of the RFTP may be divided into two parts: sending a file or symbolic link (a special type of file that refers to another file by its pathname) from the host 30 to the RMM 60 and receiving a file from the RMM 60 at the host 30.

Reliable transfer of data from the host to the RMM 60 may be accomplished, in one embodiment, by providing a reliable sender component on the host side (a host reliable sender) and an associated reliable receive component on the RMM side (an RMM reliable receiver).

The host reliable sender may comprise two threads, P1 & P2, which are started when the host 30 boots up. P1 sends out the data from the host 30 to the RMM 60 in the form of packets. P2 picks up all the replies sent by the RMM, such as an acknowledgement for a packet (ACK), a negative acknowledgement (NACK), an acknowledgement for the control message (CTRL_ACK), and an acknowledgement for the last data message (LAST_ACK). P2 then sends the replies to P1. In one embodiment, utilizing two threads may improve speed of the data transfer by designating a separate thread for receiving replies from the RMM 60.

In operation, according to one illustrative embodiment, P1 waits for a trigger message from the client. A client, as used in the discussion pertaining to RFTP, is caller of an API that requests files to be sent or received using RFTP. When the client requests that a file is sent to the RMM 60, a trigger message is sent to P1. P1 initially sends a control message with file transfer details to RMM 60 and waits for a CTRL_ACK. P2 receives the CTRL_ACK and passes it on to P1. P1 then starts sending out file data. RMM 60 sends out ACK/NACK messages, which are picked up by P2 and sent to P1. If P1 receives a NACK message from P2, P1 starts retransmitting the packets starting with the missing packet. In case the RMM 60 doesn't send ACK/NACK for a predetermined timeout interval, P1 aborts the transaction and communicates to the client FAIL information with an error number indicating the cause of failure.

On the RMM side, once the entire file is received, checksums are verified to make sure the entire file was received correctly. The LAST_ACK is then sent with the checksum indicating success/failure. After the LAST_ACK is received, and if checksum was verified, P1 communicates PASS information to the client. Otherwise, P1 sends FAIL information to the client. P1 returns to the initial state and waits for a trigger event initiated by a client.

The RMM reliable receiver, in one embodiment, is a daemon (e.g., a daemon named file_receive), which is started when RMM 60 boots up. File_receive daemon continuously reads messages from its message queue. If it gets a control message, it first checks if space is available in the file system for the requested file. If there is not sufficient space, file_receive replies with CTRL-ACK failure and aborts transaction. If space is available in the file system for the requested file, it responds with a CTRL-ACK success and waits for data messages.

When file_receive receives a data message, it writes the data into the destination file, which may be specified by the host 30 in the initial control message. In one embodiment, file_receive sends an ACK for every tenth packet it receives. If file_receive receives a packet out-of-sequence, it sends a NACK for the last successfully received packet. If the correct packet is not received for a predetermined timeout interval after a NACK is sent, file_receive resends the NACK message to the host 30. If two NACK timeouts are received, file_receive aborts this transaction, cleans up the file, and waits for the next control message.

When file_receive receives the last packet in the file, it computes and verifies the checksum associated with the file. It sends a LAST_ACK for the last packet with checksum success/failure information. On checksum failure, file_receive cleans up the file. If data packets are not received for a predetermined timeout interval, file_receive aborts the current transaction, cleans up the file, and waits for the next control message.

The symbolic link information for the entire package is maintained in a metadata file. The RMM reliable receiver, in one embodiment, may be utilized to transmit this symbolic link information. When the file_receive daemon receives the metadata file with symbolic link information, file_receive creates new and modified symbolic links in the destination directory associated with the control packet. In one embodiment, a symbolic link is created with default permissions and user/group information. Permissions and user/group information may be modified, e.g., by the firmware update mechanism running a post install script.

Reliable transfer of data from the RMM 60 to the host 30 may be accomplished, in one embodiment, by providing a reliable receiver component on the host side (a host reliable receiver) and an associated reliable sender component on the RMM side (an RMM reliable sender).

The reliable receiver component on the host 30, in one embodiment, is a thread named RMM_receive_file, which is started during the host 30 boot up. When a client calls a function responsible for receiving a file from the RMM 60, a trigger message is sent to RMM_receive_file thread. RMM_receive_file sends this control request to RMM 60 and waits for CTRL_ACK, which contains details about the file on the RMM 60. If RMM_receive_file does not receive CTRL_ACK for a predetermined timeout interval, RMM_receive_file tries to resend the control request. The transaction is aborted if RMM_receive_file does not receive CTRL_ACK for a predetermined timeout interval twice in a row.

RMM_receive_file waits for data packets, copies the received data packets into a file specified by client and sends an ACK to the RMM 60. If the ACK doesn't reach RMM 60 RMM_receive_file may resend the data. Once all data has been received at the host 30, RMM_receive_file verifies checksum for the file and reports success or failure to the client. If RMM_receive_file doesn't receive any data packets in two consecutive timeout intervals, RMM_receive_file aborts transaction and waits for a trigger event from client.

The reliable sender component on the RMM 60, in one embodiment, is a daemon (e.g., named send_file), which is started during boot up of the RMM 60. Send_file waits for control message from the host 30. Once send_file receives the control message, it determines whether the requested file exists and, if the requested file exists, sends file information back to the host 30 in the CTRL_ACK. If the requested file does not exist, send_file sends an error message to the host 30 in the CTRL_ACK. If the requested file exists, send_file starts sending the file, one data packet at a time, and waits for ACK. If it does not receive an ACK for a predetermined timeout interval, send_file resends the data packet. The transaction is aborted if send_file does not receive an ACK for a predetermined timeout interval twice in a row.

Once send_file receives ACKs for all data packets in the requested file, it stops the timer and continues waiting for the next control message. In one embodiment, if send_file receives a new request from the host 30 while it is sending data packets, send_file aborts the previous transaction and starts this new transaction.

Figure 6:
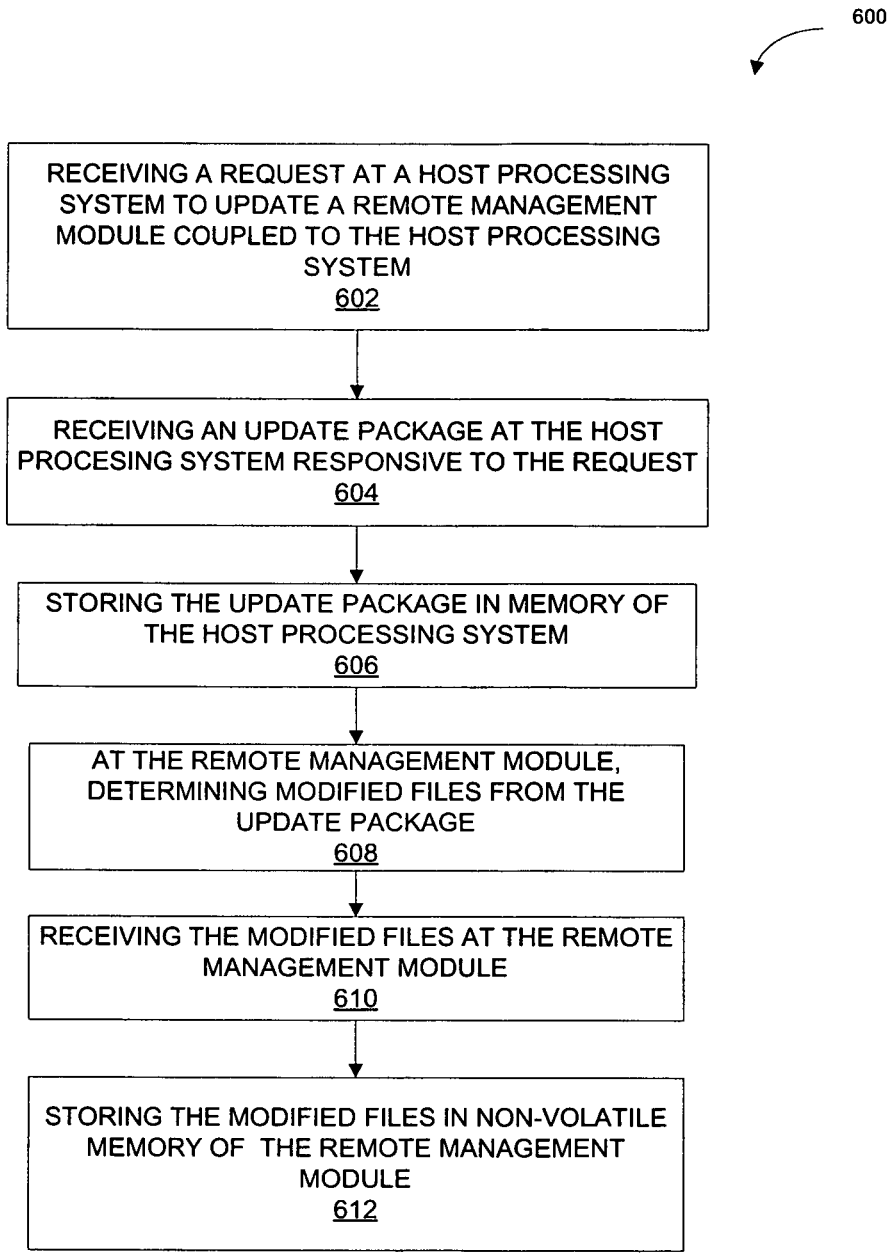
FIG. 6 is a flow chart illustrating a method for differential file-based update of the RMM, according to embodiments of the invention.

FIG. 6 is a flowchart illustrating a method 600 for differential file based update for embedded systems, according to one embodiment of the present invention. The process may be performed by processing logic that may comprise hardware (e.g., dedicated logic, programmable logic, microcode, etc.), software (such as run on a general purpose computer system or a dedicated machine), or a combination of both.

Referring to FIG. 6, the method 600 begins with processing logic receiving a request to update a remote management module, such as RMM 60 (block 602). The request may be received at the host 30 or at the RMM 60. If the request is received at the host 30, the update package is also received at the host 30, responsive to the request (block 604). The host 30 stores the received update package in memory (block 606).

At block 608, the RMM 60 determines, which files in the update package are different from the corresponding files associated with the software currently running on the RMM 60. In one embodiment, the host 30 sends to the RMM 60 metadata comprising checksums for the files in the update package. The RMM 60 utilizes this metadata to determine, which files in the update package have been changed, added, or deleted as compared to the current RMM software.

It will be noted, that the update package may comprise symbolic links, which may also change between different versions of the RMM software. Furthermore, some files in the update package may have changed inode information, permissions, and/or ownership. Thus, metadata that is used by the RMM 60 to determine which files from the update package should be stored in the RMM's non-volatile memory includes information associated with file permissions, file ownership, other file inode information, as well as symbolic link information.

After the RMM 60 determines, which files from the update package should be stored in the non-volatile memory of the RMM 60, the RMM 60 communicates this information to the host 30, and receives the needed files from the host 30 (block 610). The RMM 60 then stores the received files in its non-volatile memory, such as the FLASH chip 102 (block 612).

In one embodiment, the RMM 60 first copies the current software from the primary partition 70 of the FLASH chip 102 to the backup partition 80 of the FLASH chip 102. The RMM 60 then may test if the RMM 60 can boot successfully from the newly copied backup partition 80. If the test is successful, the RMM 60 may then update the software stored on the primary partition 70 of the FLASH chip 102 with the files from the update package received from the host 30. Thus, when some but not all files from the update package are determined as changed between the current RMM software version and the updated RMM software version, the amount of data that needs to be communicated via the serial link from the host 30 to the RMM 60 may be reduced. Furthermore, the amount of data that needs to be burned onto the FLASH chip 102 of the RMM 60 may also be reduced.

Thus, a method and apparatus for a method and apparatus for differential file based update for embedded systems have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; FLASH memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   receiving at a host processing system, a request to update current embedded software with updated embedded software that includes a new or modified file that is not identical to any file in the current embedded software and a duplicate file that matches a file in the current embedded software;
   receiving at the host processing system an update package that includes the new or modified file and the duplicate file;
   receiving, at a remote management module via a serial link, metadata associated with the update package without receiving the entire update package, wherein the remote management module has a processor and a memory, is coupled to the host processing system, is configured to facilitate management of the host processing system by a remote administrative console, and includes the current embedded software;
   identifying in the remote management module, in response to receiving the metadata, the new or modified file of the update package using the metadata;
   receiving at the host processing system, a request from the remote management module to transmit the new or modified file of the updated package and not the duplicate file; and
   updating the current embedded software by receiving at the remote management module from the host processing system the new or modified file and not the duplicate file and by writing the new or modified file to the memory of the remote management module, the writing including burning the new or modified file onto a FLASH chip.

2. The method of claim 1, wherein the new or modified file includes a file with modified content.

3. The method of claim 1, wherein the new or modified file includes a file with modified inode information.

4. The method of claim 1, wherein the new or modified file includes a file with modified permissions.

5. The method of claim 1, wherein a file in the current embedded software is characterized by a first version identification and the new or modified file is characterized by a second version identification.

6. The method of claim 1, wherein the remote management module is operational while the updating is taking place.

7. The method of claim 1, further comprising sending the metadata from the host processing system configured to provide a plurality of network hosts with access to a plurality of mass storage devices.

8. The method of claim 1, wherein the current embedded system and the updated embedded system each comprise remote management module software.

9. The method of claim 1 wherein the host processing system and the remote management module transfer data utilizing reliable file transfer protocol (RFTP).

10. A system comprising:
    a remote management module configured to be coupled to a host processing system, and further configured to facilitate management of the host processing system by a remote administrative console, the remote management module having:
    a processor;
    a memory;
    an update component configured to:
      receive from the host processing system via a serial link metadata associated with an update package without receiving the entire update package, the update package including a new or modified file that is not identical to any file in current embedded software of the remote management module and a duplicate file that matches a file in the current embedded software,
      identify the new or modified file of the update package utilizing the metadata,
      request the host processing system to transmit the new or modified file and not the duplicate file of the update package, and
      receive from the host processing system the new or modified file and not the duplicate file of the update package; and
    an update install engine configured to update the current embedded software stored in the memory of the remote management module by writing the new or modified file to the memory of the remote management module, the writing including burning the new or modified file onto a FLASH chip.

11. The method of claim 10 wherein the host processing system and the remote management module transfer data utilizing reliable file transfer protocol (RFTP).

12. A system comprising:
    a host processing system manageable by a remote administrative console, the host processing system configured to:
      receive an update package for a current embedded software, the update package including a new or modified file that is not identical to any file in the current embedded software and a duplicate file that matches a file in the current embedded software, and
      transmit metadata about the update package utilizing reliable file transfer protocol (RFTP);
      wherein to receive the update package including the new or modified file, the host processing system is configured to receive a control message from the host processing system, transmit an acknowledgement in response to the control message, receive the new or modified file, verify a checksum, and responsively transmit an acknowledgement of the new or modified file, and
    a remote management module coupled to the host processing system and including the current embedded software, the remote management module configured to facilitate management of the host processing system by the remote administrative console, and further configured to:
      receive the metadata about the update package from the host processing system without receiving the entire update package,
      identify the new or modified file of the update package utilizing the metadata, and
      update the current embedded software by receiving the new or modified file and not the duplicate file from the host processing system utilizing RFTP, and by writing the new or modified file to a memory of the remote management module.

13. The system of claim 12, wherein the new or modified file includes a file with modified content.

14. The system of claim 12, wherein the new or modified file includes a file with modified inode information.

15. The system of claim 12, wherein the new or modified file includes a file with modified permissions.

16. The system of claim 12, wherein the remote management module is operational while the update of the current embedded software is taking place.

17. The system of claim 12, wherein the host processing system is configured to provide a plurality of network hosts with access to a plurality of mass storage devices.

18. The system of claim 12, wherein the host processing system is configured to send the new or modified file to the remote management module over a serial link.

19. The system of claim 12, wherein the writing the new or modified file comprises burning the new or modified file onto a FLASH memory device.

20. The system of claim 12, wherein to transmit metadata about the update package utilizing RFTP includes to transmit a symbolic link that refers to a file.

21. A system comprising:
   a host processing system manageable by a remote administrative console, wherein the host processing system is configured to provide a plurality of network hosts with access to a plurality of mass storage devices, and wherein the host processing system is further configured to:
      receive an update package for current embedded software, the update package including a new or modified file that is not identical to any file in the current embedded software and a duplicate file that matches a file in the current embedded software, and
      transmit metadata about the update package utilizing reliable file transfer protocol (RFTP),
      wherein to receive the update package including the new or modified file, the host processing system is configured to receive a control message from the host processing system, transmit an acknowledgement in response to the control message, receive the new or modified file, verify a checksum, and responsively transmit an acknowledgement of the new or modified file; and
   a remote management module coupled to the host processing system and including the current embedded software, the remote management module configured to facilitate management of the host processing system by the remote administrative console, and further configured to:
      receive the metadata about the update package from the host processing system without receiving the entire update package,
      identify the new or modified file of the update package utilizing the metadata,
      request the host processing system to transmit the new or modified file and not the duplicate file of the update package, and
      update the current embedded software by receiving the new or modified file and not the duplicate file from the host processing system utilizing RFTP, and by writing the new or modified file to a memory of the remote management module.

22. The system of claim 21, wherein the new or modified file includes a file with modified content.

23. The system of claim 21, wherein the new or modified file includes a file with modified inode information.

24. The system of claim 21, wherein the new or modified file includes a file with modified permissions.

25. The system of claim 21, wherein the remote management module is operational while the update of the current embedded software is taking place.

26. The system of claim 21, wherein the host processing system is configured to send the new or modified file to the remote management module over a serial link.

27. The system of claim 21, wherein the writing the new or modified file comprises burning the new or modified file onto a FLASH memory device.

* * * * *

UNITED STATES PATENT AND TRADEMARK OFFICE
CERTIFICATE OF CORRECTION

| | | |
|---|---|---|
| PATENT NO. | : 8,554,748 B1 | Page 1 of 1 |
| APPLICATION NO. | : 11/292396 | |
| DATED | : October 8, 2013 | |
| INVENTOR(S) | : Kiran Kamity et al. | |

It is certified that error appears in the above-identified patent and that said Letters Patent is hereby corrected as shown below:

In the Specification

In column 7, line 53, delete "CTRL-ACK" and insert -- CTRL_ACK --, therefor.

In column 7, line 55, delete "CTRL-ACK" and insert -- CTRL_ACK --, therefor.

In the Claims

In column 12, line 20, in claim 11, delete "method" and insert -- system --, therefor.

Signed and Sealed this
Twentieth Day of May, 2014

Michelle K. Lee
*Deputy Director of the United States Patent and Trademark Office*